(12) United States Patent
Richard

(10) Patent No.: US 8,443,832 B2
(45) Date of Patent: May 21, 2013

(54) SEQUENCER ASSEMBLY, SYSTEM AND METHOD

(76) Inventor: James G Richard, Tolland, MA (US)

(*) Notice: Subject to any disclaimer, the term of this patent is extended or adjusted under 35 U.S.C. 154(b) by 736 days.

(21) Appl. No.: 12/536,487

(22) Filed: Aug. 6, 2009

(65) Prior Publication Data

US 2011/0030814 A1 Feb. 10, 2011

(51) Int. Cl.
*F16K 31/18* (2006.01)

(52) U.S. Cl.
USPC ...... 137/423; 137/119.01; 137/428; 137/397; 137/578; 137/627; 137/861

(58) Field of Classification Search
USPC ............... 137/861, 627, 395, 396, 397, 398, 137/423, 429, 428, 578, 119.01, 118.01
See application file for complete search history.

(56) References Cited

U.S. PATENT DOCUMENTS

| | | | |
|---|---|---|---|
| 5,101,849 A | 4/1992 | Richard | 137/15 |
| 5,290,434 A | 3/1994 | Richard | 210/109 |
| 5,941,535 A | 8/1999 | Richard | 277/606 |
| 6,447,680 B1 | 9/2002 | Richard | 210/532.2 |
| 6,554,021 B1 * | 4/2003 | Sondov | 137/396 |
| 6,640,828 B2 * | 11/2003 | Dautais | 137/403 |

OTHER PUBLICATIONS

Metcalf, Leonard and Eddy, Harrison P., "Sewerage and Sewage Disposal, A Textbook" 1922, pp.

* cited by examiner

*Primary Examiner* — Craig Schneider
(74) *Attorney, Agent, or Firm* — Wasserbauer Law LLC; Damian Wasserbauer

(57) ABSTRACT

This invention pertains to a sequencer for controlling the distribution of fluid input into a tank to at least two outlets using a plurality of cells connected to actuate a respective floating outlet. Each of the cells has a relatively uniform construction comprising an enclosure and a float. Each enclosure has an inlet arranged at one end to allow fluid therein and offset openings at an opposite end. The enclosure also is configured to accept the float in an inner cavity and arranged so as to allow the fluid therein to cause said float to move within said enclosure. Each cell is further arranged in pairs of a lift cell and a trigger cell adapted to actuate a floating outlet. Each float has an inclined upper surface configured to transfer a ball through the offset openings as the fluid causes the float to rise and fall from each cycle of actuate a respective floating outlet. The sequencer being particularly adapted to a system and method for dosing a septic system having two or more disposal fields.

10 Claims, 9 Drawing Sheets

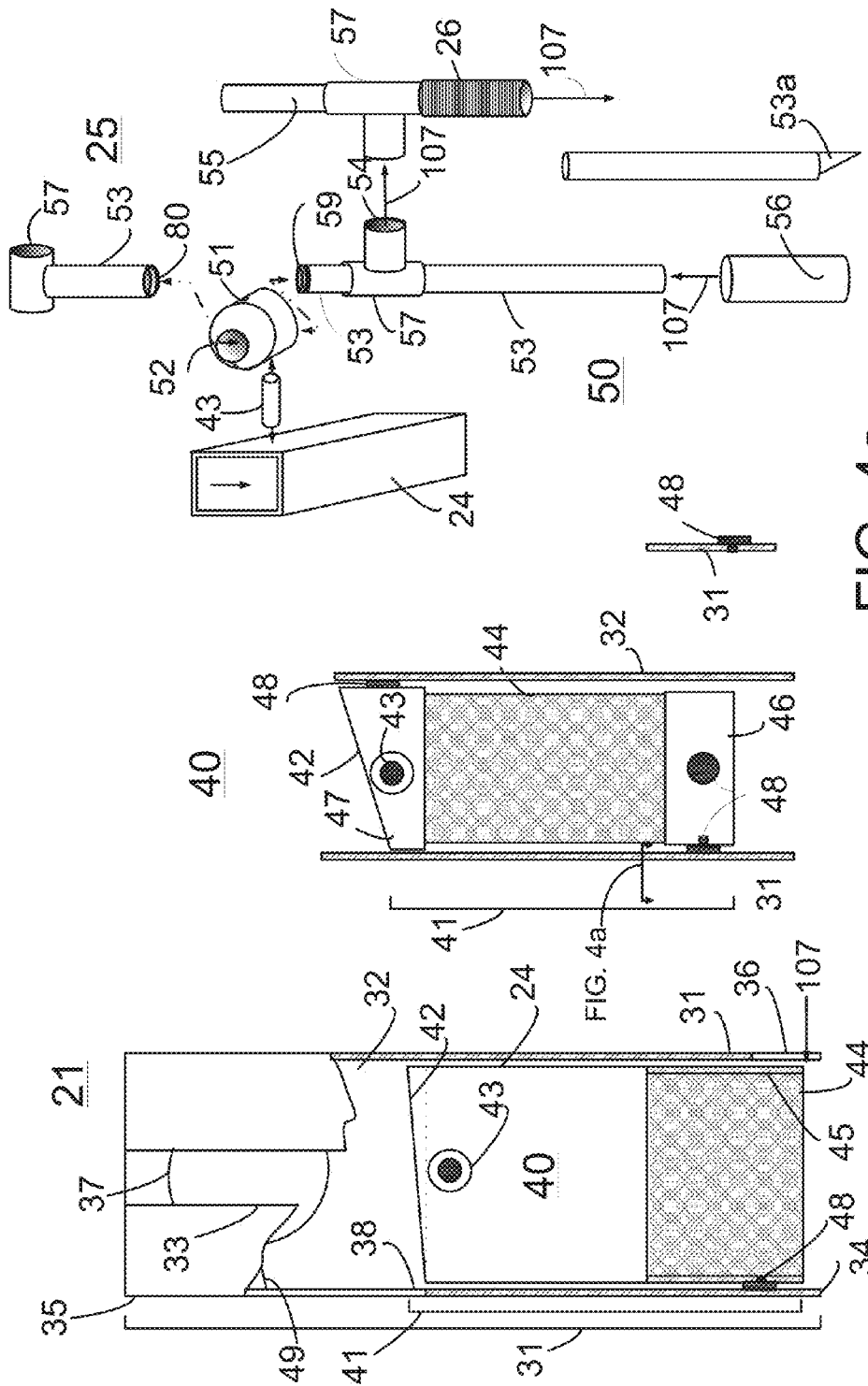

SEQUENCER ASSEMBLY, SYSTEM AND METHOD

FIELD OF THE INVENTION

The present invention is directed to an assembly, system and method for sequencing the output of a fluid between a plurality of outlets and, more particularly, to a sequencer for automatically dosing a plurality of fields in a septic application.

BACKGROUND OF THE INVENTION

Tanks for storing water and other fluids are used in many agricultural, residential and industrial applications including catch basins, cisterns, storage, reservoirs, hoppers and the like. Tanks are useful in many applications for storing, and then later processing in known ways, waste water, run off or sewage from a household, business or public disposal system. In sewage applications, processing can include flushing the tank in incremental doses for particular advantages of extending the life of tank systems, reduce clogging, and improve efficiencies of the tank, disposal field, and/or other part of the system.

The primary object of flushing and or dosing devices is to purge the tank at periodical intervals, thereby carrying off suspended matter and sediment and reducing them from the tank. Flushing can be performed either manually or automatically. Manual flushing has many disadvantages including requiring a hose, access to the tank and outside water sources, labor costs from the involvement of persons, and the associated the costs of such time, labor and water.

There are various means available for pumping and or dousing non-flowing reservoirs, wells, septic tanks, cisterns and the like including subsurface pumps and/or valves which are electrically or hydraulically actuated. Fluid control systems of the electrical type to control flow to an output from and input are generally available in the form of sump pumps or pumping stages. Additionally, computer control technology can be used to sequence flow utilizing electrically energized and manipulated valves, pumps and other fluid devices have been utilized in electro-hydraulic controls that connect and disconnect in sequence surface power to a plurality of down-hole, in-well pumps. Electrically actuated sequenced systems have limitations in adverse and submerged applications such as hydroponics, septic systems and underground tanks. Furthermore, when electro-hydraulic or hydraulic control systems are used, total failure of the control system is a known problem, disadvantage, and is one of the more difficult problems to overcome as substantial damage can occur to a residence or commercial building and the remedy is a costly opening, digging up, removal, and rebuild of the system.

Automating flushing overcomes the disadvantages of doing it manually, however, known automating flushing systems have had disadvantages of increased cost and complexity without improving reliability. Moreover, many systems require creating and building additional flushing tanks and structures associated with these siphon or flush tanks. For example, a conventional Millar flushing system creates an automated flush-tank; however, it has disadvantages of an additional tank and associated structures and cannot dose multiple outlets. Similarly, a Rhoads-Millar Concord inverted siphon has disadvantages of increased cost and complexity from the multiple structures associated with its inlet and outlet structure. Additionally, a Van Vranken flush tank terminates in a well in the floor of the tank, which tends to clog over time and has disadvantages of increased cost and complexity due to the construction of additional tank and well-structure as well as the associated additional costs of maintaining it. These known systems also suffered from disadvantages associated with the efficiency and effectiveness of the siphons, flush tank structures, which limited their adoption and widespread use. Accordingly, there is a need in the art for an apparatus, system and method of automated flushing that is reliable, resistant to failure and that can dose multiple outlets. In addition, there is a long-felt need for controlling the sequence of flushing of multiple outputs of a tank in an automated way.

What is desired, then, is a sequencer, system and method of sequencing fluid to a plurality of outlets with advantages of low cost, effective, efficient, durable and resilient to failure and, more particularly, to a sequencer for automatically dosing of the effluent a plurality of septic fields that has advantages of flexibility, durability and ease of serviceability.

SUMMARY OF THE INVENTION

It is an object of the present invention to provide a sequencer, system and method of sequencing fluid to a plurality of outlets with advantages of low cost, effective, efficient, durable and resilient to failure.

It is also an object of the present invention a sequencing apparatus and system for sequencing the output of a fluid to a plurality of outlets.

Another object of the present invention is to provide a method of sequencing a fluid to more than one outlet.

Another object of the present invention is to sequence a septic system between multiple fields which is relatively easy to install and does not consume energy, yet is reliable and not prone to breakdown, clogging, or other failure.

It is an object of the present invention to provide an apparatus, system and method of automated flushing and/or dosing is sequence outputs to a plurality of disposal fields.

It also is an object of the present invention to provide an apparatus, system and method of dosing effluent from a tank to more than one field.

An object of the present invention is to provide an effluent dosing septic system that can easily accommodate the effluent from a residence, building or larger capacity regardless of the variations of flow to more than one disposal fields.

The inventive sequencer comprises a plurality of cells for actuating a predetermined floating outlet so as to control the distribution of fluid to at least two outputs. Each cell comprises an enclosure, a float having an inclined upper surface, and a movable mass. Each enclosure has an inlet to allow fluid into each cell causing the float to be raised or lowered by the fluid, and openings to allow the movable mass to enter and exit each of the cells sequentially. The cells being arranged in pairs of a lift cell and a trigger cell with the trigger cell connected to a trigger tube that causes the fluid to flows to the predetermined floating outlet when the movable mass enters the trigger cell.

An inventive sequencer system for sending fluid to two or more outputs comprising a tank having an input to a desired level, a plurality of outputs to output the fluid from the tank to a predetermined one from the plurality of outputs, a flout connected to each of the plurality of outputs from the tank; and a sequencer connected to each flout responsive to the desired level, the sequencer configured to control actuation of flouts and thereby the output of fluid in a predetermined sequence to at least one of the plurality of outputs.

An inventive method of sequencing the output of fluid, at a desired level of fluid in a tank, to two or more outputs of the tank comprising the steps of determining a desired level to empty the fluid from the tank; monitoring the desired level using a trigger cell connected to a trigger tube each being associated with a flout connected with a particular one of the plurality of outputs; and actuating in a predetermined sequence the flout sending fluid to at least one of the plurality of outputs at the desired level to empty fluid from the tank. The method advantageously can adaptively alter the sequence of outputs, output to a particular output multiple times, and output a different volume of fluid from the tank.

In light of the deficiencies of prior art flushing and/or dosing methods, it is an object of the present invention to provide a method of sequencing a fluid from one input to more than one outlet in the seepage and/or sewage application and in particular to providing improved efficiencies, flexibility, durability, reliability in dosing septic systems which can easily accommodate the effluent from a residence, building or larger capacity regardless of the variations of flow to more than one disposal field.

BRIEF DESCRIPTION OF THE DRAWINGS

FIG. 3 illustrates a partially exploded schematic view of a lift cell;

FIGS. 4 and 4a illustrates a partially exploded schematic view of a trigger cell;

FIG. 5 illustrates a partially exploded schematic view of a trigger tube assembly;

DESCRIPTION OF THE EMBODIMENTS

Figure 1:
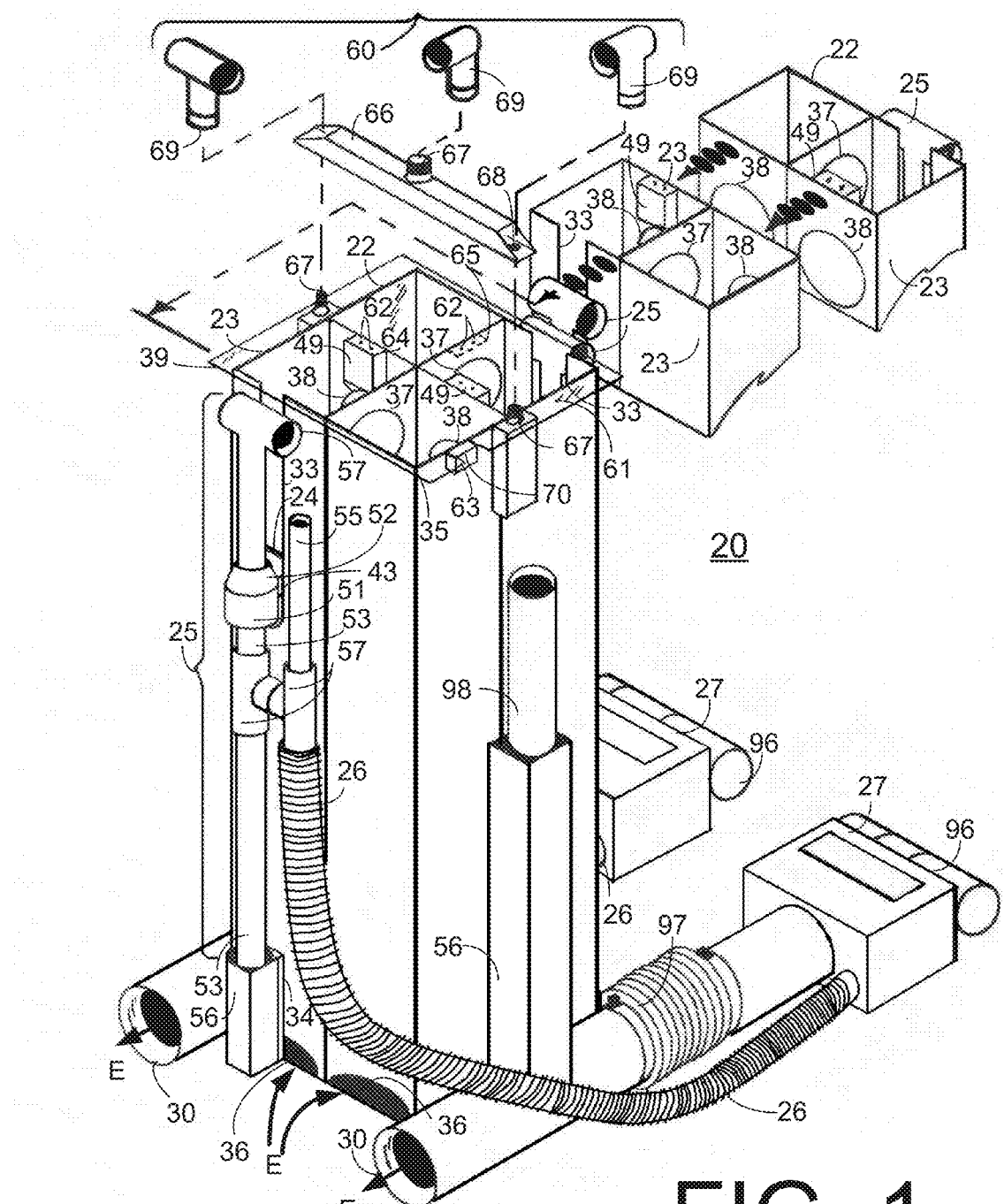
FIG. 1 illustrates a perspective schematic view of the sequencer and system of the present invention.
Figure 2:
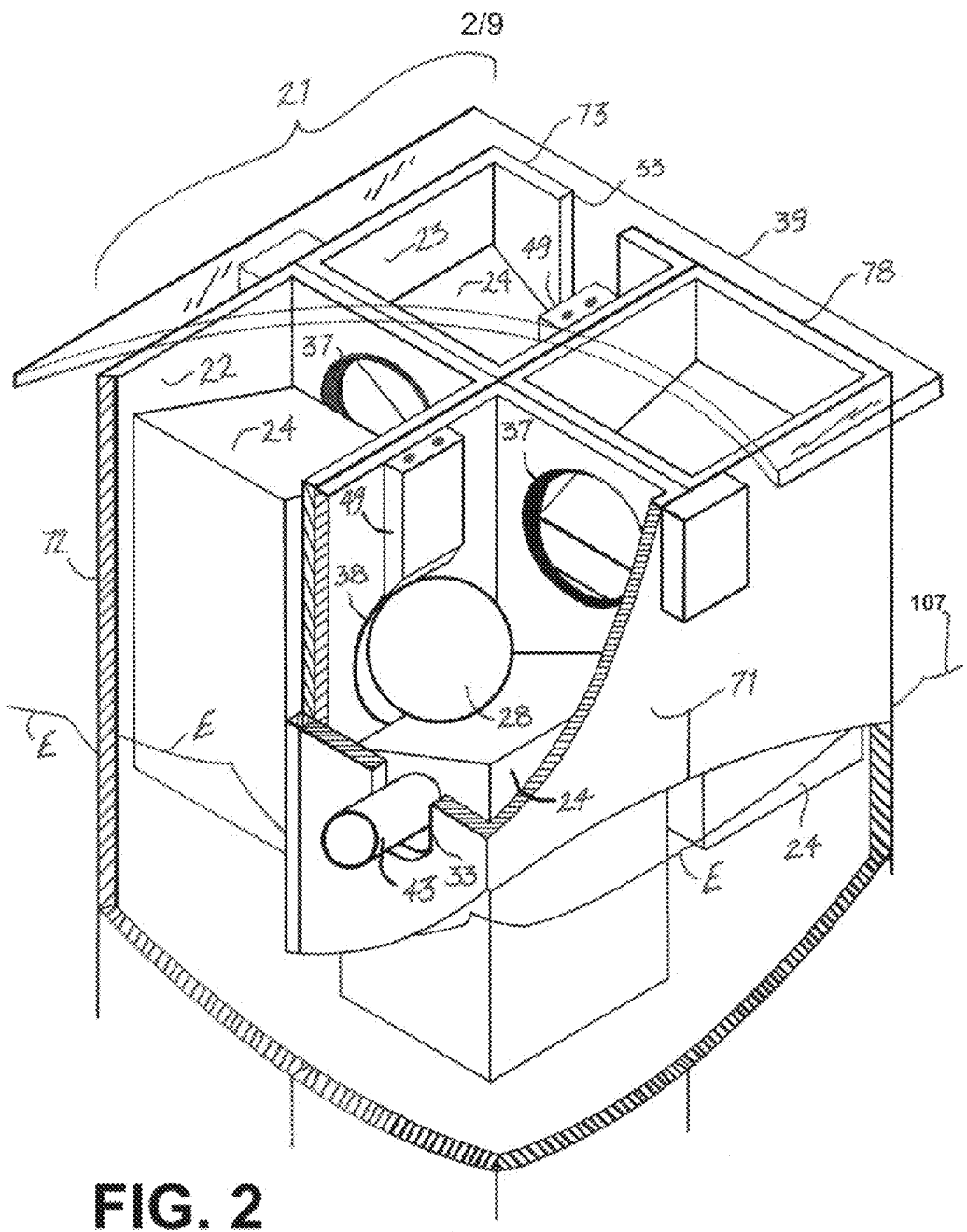
FIG. 2 illustrates a partially exploded perspective view of a sequencer assembly.

As is illustrated in FIGS. 1-12, where like reference numerals are identified by like elements throughout the drawings, non-limiting embodiments of the apparatus, system and method of sequencing of present invention are described with reference to the accompanying the drawings. Referring now to FIGS. 1 and 2, a sequencer assembly according to an exemplary embodiment of the present invention is generally designated by element 20. The sequencer assembly 20 is configured from a plurality of cells 21 arranged in pairs of a lift cell 22 and a trigger cell 23 each having a float 24 of a generally uniform construction. The trigger cell 23 float 24 connects to a trigger tube 25 for sending fluid via trigger hose 26 connected to a floating outlet or flout 27. The lift cell 22 functions to lift a movable mass 28, in the form of a ball according to a preferred embodiment of the invention, and send it to the trigger cell 23. The trigger cell 23 functions to actuate a particular, desired floating outlet 27. Each floating outlet 27 is adapted to drain tank 29 through an outlet pipe 30.

In operation, sequencer assembly 20 operates using the combined action of the lift and trigger cells 22 and 23, respectively. The float 24 of lift cell 22 lifts the ball 28 sending it to the adjacent trigger cell 23. The ball 28 weights down the float 24 of the trigger cell 23 sending fluid through hose 26 to a particular floating outlet or flout 27 before any of the other floating outlets connected to the plurality of outlets 30 being controlled by sequencer assembly 20. In particular, the trigger cell 28 lowers an attached the trigger tube 25 relative to other trigger tubes, thereby causing fluid to flow through trigger hose 26 to begin filling the head of the connected floating outlet 27 and causing it to sink and drain the tank 29 through outlet pipe 30. In this manner, a particular floating outlet 27 sinks before the other floating outlets, which merely float their way down during the triggered cycle. Generally, the height of the sequencer assembly 20 is made three (3) inches greater than the upper extension of the flout 27 when floating, as measured from the bottom wall or floor of the tank 29, such as, for example, the configuration has the sequencer 20 height at 24" and the upper extension is 27". Further details on the operation of floating outlets 27 is described and shown in the teachings of my U.S. Pat. No. 5,290,434 entitled "Effluent Dosing Septic System" relating to floating outlets, which teachings are incorporated by reference. The flouting outlet 27 is manufactured be Rissy Plastics, LLC, 350 Cedar Lane, Torrington, Conn., 06790 under the registered trademark FLOUT®.

Referring to FIGS. 1, 2 and 3, each cell assembly 21 has a generally uniform construction useful for the lift cell 22 and the trigger cell 23, thereby simplifying design, improving efficiency, and lowering manufacturing costs. Each cell assembly 21 has an elongated body 31 forming an enclosure 32 adapted to receive the float 24 therein. The elongated body portion 31 has a predetermined length determined by level of fluid in the tank such as, for example, in the application of dosing a septic tank, the length of the body portion is determined volume of water desired and/or level required for a particular dosing application. Each trigger cell 23 is configured with a passage or slot 33 allowing the float 24 to connect to the trigger tube 25. The slot 33 a difference in uniform construction of the trigger cell 23 and the lift cell 22, whereby the slot can be molded therein or made by an additional manufacturing step of milling it therein.

Each body portion 31 can made from thermoplastic polymers such as polyvinyl chloride (PVC) tubing, which is lightweight, waterproof and durable. Suitable PVC tubing and fasteners for use in the present invention is manufactured by the United States Plastics Corporation. Polyvinyl chloride, (IUPAC Poly(chloroethanediyl)) and is commonly abbreviated PVC. According to an exemplary embodiment of the present invention, an enclosure 32 is formed by the square sides of the elongated PVC tubing, which advantageously can be made from three inch extruded, square PVC pipe stock cut to the predetermined length. The body 31 further is hollow and open at each end forming a lower end 34 and upper end 35. The lower end 34 can have an opening 36 milled therein, such as a semi-circular cutout, to facilitate the entry of fluid from the tank 29 and, where sediment in the tank 29 is a design concern, to improve operability the long term operability of each cell assembly 21.

According to an embodiment of the invention in a septic system application, it is an advantage to have effluent E enter through opening 36 from the bottom of cell 21 in the tank 29 so to minimize fouling and/or otherwise clogging the sequencer assembly 20, improving its durability, and reducing and/or eliminating servicing. The upper end 35 has an entry opening 37 and an exit opening 38 formed therein. The entry and exit openings 37, 38, respectively, are configured with a predetermined offset so as to pass the ball 28 between cells 21 during the operation of the cycles of the sequencer assembly 20. The predetermined offset between the entry opening 37 and exit opening 38 is determined by the desired level to trigger and/or actuate the emptying of fluid from in the tank 29. For example, the height of water from the bottom of the tank to the lower edge of slot 33 is used to determine the level to trigger emptying fluid from the tank 29. It is also important to arrange the exit opening 38 with the entry opening 37 when assembling cell pairs, for example, alternating the predetermined offset of entry, exit openings 37, 38 from high-to-low low-to-high so as to transfer the ball 28 sequentially lift cell 22 to trigger cell 23 to lift cell 22 to trigger cell 23, . . . etc. so as to create the sequence of cycles of the sequencer assembly 20. Lastly, the upper end 35 of each of the cells 21 of the sequencer assembly 20 can be shielded from debris by utilizing a cover assembly 39 as discussed herein.

Referring to FIGS. 1, 2, 3 and 4, each float assembly 40 is comprised of a float body 41 having an upper inclined surface 42. The float body 41 is configured to be slightly longer for the lift cell 22 than for the trigger cell 23 to assure positive transfer of the ball 28 to the trigger cell 23 before the trigger float 24 begins to rise. The upper inclined surface 42 construction of the float 24 is utilized in the design for both the lift cell 22 and trigger cell 23. The float body 41 is configured to be buoyant, for example, with a specific gravity less than 1, so as to float upon a particular fluid input to the tank 29. The float body 41 can be made solid or semi-solid, for example, a solid float body 41, either as a solid piece or hollow as desired, can be formed by injection molding of plastics or the like. In a modification from the standard configuration for float 24, each trigger cell 23 float 24 includes a connection 43 to the trigger tube 25 through the slot 33 in the upper end 35. The connection 43 can be made integral or separate such as, for example, a fastener, screw and nut, integral fitting, post, fastener, or both.

In a preferred embodiment of the present invention, the float assembly 40 can have a uniform configuration of a float body 41 and buoyant material 44 disposed within an enclosure 45 formed by the float body 41. The float body 41 can made from suitable materials with qualities of lightweight, fluid- or water-proof and durable such as, for example, suitable materials are polyvinyl chloride (PVC) tubing. The enclosure 45 forming the float body 41 is configured with an outer dimension smaller than the enclosure 32 of the body 31 of cell assembly 21 so as to receive float 24 slidably therein, for example, the body 31 can be of 4" inch Outer Diameter square pipe and a 3½" inch float body 41 creating a ⅛ inch space around the entire float. The float body 41 uses suitable materials of square extruded PVC pipe cut to a predetermined length. The predetermined length of the float body 41 is configured with a length dimension shorter than the cell assembly 21 and with sufficient clearance to align the lowest edge of the inclined surface 42 at the entry opening 37 or exit opening 38, respectively. The predetermined length of the float body 41 is advantageously adaptable, for example, the length can be determined by the volume of water sought for a particular application and/or tank 29.

Suitable buoyant materials 44 are closed-cell plastic materials having a specific gravity less than one (1). Other qualities include being lightweight, application fluid-proof, waterproof, and durable. Buoyant materials 44 are selected so as to allow the float 24 to move—rising and falling—within the cell assembly 21 of the sequencer assembly 20. In a preferred embodiment, polystyrene insulation is used for the buoyant material 44, which can be formed in sheets, foam and or other forms. Sheets of polystyrene insulation manufactured by Owens Corning can be used such as, for example, cutting sheets to the inner dimensions of the enclosure 45, measured and cut lengthwise as to the predetermined length desired, inserted, and secured into the cavity of float body 41 enclosure 45 such as secured by mechanical means such as fasteners, staples or the like that do not protrude outside of the enclosure, or secured by adhesives. Suitable adhesive is fluid-proof and/or waterproof, and has a quality of expanding so as to form a durable, secure adhesion between adjacent surfaces of the buoyant material 44 and float body enclosure 45. According to an embodiment of the present invention, suitable expanding urethane adhesive is sold by the name of Gorilla Glue® and manufactured by the Gorilla Glue Company, Cincinnati Ohio with a chemical composition disclosed as being comprised essentially of Urethane polymer and Polymeric MDI, which is a mixture of 4,4'-Diphenyl-methane-diisocyanate, isomers and homologues.

In an alternative embodiment, as illustrated in FIG. 4, the float assembly 40 can be formed from a lower collar 46 and an upper collar 47. The upper collar 47 portion is configured to include the inclined surface 42. The float assembly 40 configuration formed from a lower collar 46 and an upper collar 47 reduces the overall materials needed to form float assembly 40 and advantageously lowers the cost of the sequencer assembly 20.

According to an embodiment of the present invention, the configuration of the upper, lower collar 46, 47 can be manufactured in a cost-saving process by forming it in an elongated fashion. For example, doubling the length of the upper collar 47, measuring and cutting double the predetermined length of insulation needed for the application, gluing the upper collar 47 section at a mid-point of the predetermined length, cutting the upper collar 47 at the angle of inclined surface 42, and adding a lower collar 46 at each end, thereby forming two float assemblies 40. Instead of doubling, the lengths could be multiplied by 4, 6, 8 . . . n*2, with collars being placed and cut to form the upper and lower collar portions 47 and 46, respectively.

A bearing or spacer 48 such as a slide or integral post can be utilized. The bearing 48 is manufactured from suitable materials having qualities of low cost, durable, and low friction such as, e.g. nylon. The bearing 48 can be located on an exterior surface of the float body 41, or lower collar 46, and arranged at the lower end of the float body 41 on the surface and same side of as the lower edge of the upper inclined surface 42. Another bearing 48 can be located on an exterior surface of the float body 41, or lower collar 46, and arranged at the lower end of the float body 41 on the surface located opposite the entry opening 37 as oriented when the float is put into the cell 21, as shown in FIGS. 3 and 4. The spacer 48 functions to optimize sliding between the adjacent surfaces of: the exterior surface of the float 24 and an interior surface of the enclosure 32 of body 31 such as, for example, these surfaces can bind or otherwise lock by suction between adjacent surfaces having too little fluid there between. As illustrated in FIG. 4a, spacer 48 can be placed on the interior surface of the body 31 of cell assembly 21, rather than on the float 24 or float body 41, to optimize sliding between the adjacent surfaces of the float 24 and the cell assembly 21.

As illustrated in FIGS. 1 through 4, each lift cell 22 is configured to have a hollow body portion 31 forming a cavity or enclosure 32 with lower end 34 and upper end 35 for accepting a float 24. The lift cell 22 lacks the slot 33, connector 43, and trigger tube 25 that are found in the trigger cell 23. The predetermined length of the body portion 31 is determined by the application such as, for example, so as to dose at a particular fluid level, for a desired volume of water, or the like. Overall, the float body 41 is designed to align the lowest edge of inclined surface 42 at the entry opening 37, or at the exit opening 38, as the case may be. The float 24 rises and falls in the lift cell 22 with the rising and falling of the fluid level in the tank 29. According a predetermined cycle of the sequencer assembly 20, the lift cell 22 will receive the ball 28 from the adjacent trigger cell 23 through the entry opening 37 as the float 24 sinks. The inclined surface 42 moves and settles the ball 28 against an interior surface of the cell body 31 ninety degrees away from the entry opening 37 during fall and then rise of the float 24. The ball 28 is transferred to the trigger cell 23 through the lift cell 22 exit opening 38 as the lower edges of the inclined surface 42 and exit opening 38 align, thereby allowing the ball 28 to freely pass there through to the adjacent trigger cell 23.

Similarly, as illustrated in FIGS. 1 through 4, each trigger cell 23 is configured to have a hollow body portion 31 forming a cavity or enclosure 32 with lower end 34 and upper end 35, respectively, for accepting a float 24 with an upper inclined surface 42. The trigger cell 23 includes the integral passage or slot 33 for connecting the float 24 by connector 43 to trigger tube 25 such as, for example, by a fastener, post, integral post and the like. The passage or slot 33 is made slightly oversized so as to allow connecting between the trigger tube 25 and the float 24 as well as to absorb any stresses induced to it by the trigger tube 25. The slot 33 is configured to have a length ending above the maximum level of fluid to be output from the tank 29 according to a particular application so as to reduce fouling by debris or the like that may stop the operation of sequencer assembly 20.

Referring to FIGS. 1, 2, 3 and 5, the trigger tube 25 can be formed from a singular construction, or sectional as is illustrated by a trigger tube assembly 50. The trigger tube assembly 50 includes a housing 51 configured with an aperture or hole 52 for receiving a tube or pipe 53. The tube 53 is configured with an outlet 54 for connecting to a floating outlet 27, vent 55 and guide 56 configured to receive a lower, distal end of the tube 53 therein. The housing 51 is connected to the float 24 of a trigger cell 23 by the fastener connection 43 passing through slot 33, as shown in FIGS. 1-3 and 5. The housing 51 can be configured as a bell-type housing so as to guide the bell-housing over the trigger tube 25 when removing and/or inserting the float 24 connected thereto during maintenance and advantageously from outside of the tank 29. The housing 51 can be made of durable, low cost plastic material. For example, a PVC diameter-reduction-fitting can be adapted to make the hole 52 at one end. Connection 43 can be configured by a bolt and fastener securing trigger float 24 to the housing 51. The hole 52 is configured with a diameter sufficient to receive the proximal end of tube 53 therein, which proximal end is sealed so that fluid 107 flows out of outlet 54 through T-connection 57 to the hose 26 to actuate a flout 27. For example, hole 52 is configured slightly oversized so as to allow the tube 53 of trigger tube 25 (i) to rotate freely therein, and (ii) to absorb any stresses induced to it by the operation of either the connection to the float 24 or the trigger tube 25.

In an embodiment of the present invention, the trigger tube assembly 50 is formed from sections of U.S. Pat. No. /1;2 inch PVC tubing configured to form the portions of tube 53, various T-connections 57 formed from a ½ inch PVC t-fitting to form the outlet 54, to form the vent 55 and hose 26, to form a handle to service, the tank, as well as PVC connectors and other threaded fitting configured to form a connection between end 59 and opening of receptacle 80 such as, for example, by a threaded connection. The elongated section of tube 53 can be configured with an angled- or otherwise non-perpendicular, distal end 53a that reduces clogging, reduce of diameter, or otherwise stoppage by sediment or the like, of fluid 107 to flow up the tube 53 and out outlet 54 down trigger hose 26 to the respective floating outlet 27. Another short section of tube 53 is used at the proximal end above the T-connection of outlet 54 and configured to include a threaded PVC connection for connection point 57 and of a diameter sufficient to pass through hole 52. This construction has advantages in using PVC materials as well as using elongated PVC T-connection 57 to service the trigger tube 25 once installed from outside of the tank 29. The T-connection 57 can advantageously be formed from a ½-inch PVC T-fitting. The vent 55 functions to allow air to release pressure, clearing the trigger tube 25 at the end of the triggering cycle, thereby returning the floating outlet 27 to a floating position. One or more vents 55 can be formed at different locations in the trigger tube assembly 50 such as at the outlet 54 and/or connection point 57, although it is preferable to form the vent above the trigger hose 26 by section 55 rather than above outlet 54. In a preferred embodiment to make the trigger tube easily serviceable, an elongated PVC T-connector is configured to access a fitting 59 of the trigger tube assembly 50 as such can be formed from PVC connectors of a threaded connection between end 59 and opening of receptacle 80. In a preferred embodiment, the vent 55 is located at the outlet 54, whereby the outlet includes a further T-connection 57 adapted to have one end attached to vent 55, another end attached to trigger hose 26, and another end attached to the trigger tube 25 at outlet 54. Proper functioning of the vent 55 is ensured by extending a section of tubing 53 above the highest level of fluid to exist in the tank 29. The outlet 54 can be connected to the trigger hose 26 itself fastened by a clamp or the like without the t-connection 57, although it is preferable to form the vent by section 55 above the trigger hose 26 rather than above outlet 54. The guide 56 functions to align the tube 53 with the slot 33 so as to create smooth motion of float 24 in the trigger cell 23 when the fluid rises and falls. The guide 56 can be formed from a section of PVC tubing of larger diameter than the diameter of tube 53, for example, ¾ inch PVC tube to accept ½ inch PVC section 53. The guide 56 can be attached to the cell 21 by circle clamps or the like. In an embodiment of the present invention, the guide 56 also can be formed from a ¾ inch section of square PVC tubing can be ripped in half, lengthwise, then affixed the guide 56 to the exterior of cell 21 at the with PVC adhesive sufficient to receive and to affix the guide 56 at the ¾ inch section of square PVC tubing so as advantageously to reduce material costs by eliminating circular clamps, and also increasing durability in a submerged environment.

The ball 28 is configured to fit and roll between entry 37 and exit openings 38 of the sequencer assembly 20 using gravity only to act upon the ball on the upper inclined surface 42 of a float 24 and the rising and falling of fluid 107 in the tank. The mass of the ball 28 can be formed from suitable material that withstands degradation and is fluid-, water-proof. According to a preferred embodiment of the present invention, the mass or ball 28 can be made of polymeric material as is commonly found in a billiard ball. In addition, a combination of factors such as the mass of the ball, the density of the fluid in the tank 29, and the density of the float 24 are used to determine optimal weight. For example, the optimal weight of the ball 28 can be reduced by utilizing the stop blocks 49, positioned above every exit opening 38 of at trigger cell 23, functioning to pin the ball 28 as the float 24 rises in the trigger cell 23, thereby holding down holding the outlet 54 under the rising level of fluid 107 thereby starting fluid flow out trigger hose 26 to the respective floating outlet 27 causing it to sink earlier than the other floating outlets. Pinning allows the ball 28 to be configured lighter, or alternatively its mass is lower, because sequencing is not solely actuated by the weight of the ball 28. Moreover, a lighter ball 28 has advantages of reducing materials and cost of sequencer assembly 20 such as, for example, float 24 can be configured with a shorter float body 41, which is particularly advantageous for the lift cell 22 to be able to operate at shallower fluid levels. Finally, effective movement and operation of the ball 28 is effectuated by determining the maximum level of fluid and ensuring that ball movement occurs above the maximum level of fluid.

As is illustrated in FIGS. 1 and 2, the cover 39 is configured to shield the upper end of the sequencer assembly 20 from having debris and other fouling materials being introduced there through. According to an embodiment of the present invention, a cover assembly 60 has a shield 61, a plurality of stop blocks 49 secured at holes 62 in the cover assembly 60, and a notch 63 to guide the cover 39 onto the sequencer assembly 20 in a singular, standard position, which position is advantageous in determining ball 28 flow, cell 21/floating outlet 27 on/off positions, and visual inspection of the operation of the sequencer assembly 20 from a position outside of the tank 29.

The shield 61 is made from suitable plastic for durability and, preferably from clear plastic, to allow for visual inspection of the sequencer assembly 20 operation once installed in the tank 29. Similarly, the stop blocks 49 are made from suitable materials with lightweight, strong, durable, and fluid-, water-proof qualities such as, for example, Lexan® polycarbonate resin thermoplastic plastic stock manufactured by SABIC Innovative Plastics. Holes 62 are arranged at positions above an entry opening 37 and exit opening 38 and relate to an open position 63 and a closed position 64, respectively. Open 63 and closed 64 positions form the on/off switch of a cell 21 and floating outlet 27 of the sequencer assembly 20, for example, placing the stop block 49 at the open position 63 opens a lift cell 22/trigger cell 23 pair so as actuate the respective floating outlet 27 thereby sending fluid 107 out of outlet pipe 30 from the tank 29.

The cover 39 can be held in place by a bracket 66 configured with apertures or holes 67 at distal ends thereof and a nipple 68 at a mid-portion thereof. The apertures or holes 68 are used to secure the cover 39 to the sequencer assembly 20 by a plurality of clips or fasteners 69. The nipple 67 secured to the bracket 66 is for servicing the sequencer assembly 20. The nipple 67 and plurality of clips or fasteners 69 can be made from threaded PVC pipe stock commonly found as molded ends. The service nipple 67 can be secured to the bracket 66 by glues or other lightweight, strong, durable, and fluid-, water-proof adhesives, for example, adhesive solvent cement manufactured by T. Christy Enterprises, Inc., Anaheim, Calif. Similarly the nipples 67 can be joined to the posts set in the sequencer assembly 20 by solvent cement.

The fastener 69 can be a speed clip, threaded bolt and nut, or the like. The fastener 69 advantageously can be a combination of a male/female threaded molded PVC pipe fitting with the female threaded fitting secured on posts of the sequencer and a male threaded fitting secured to an elongated T-bar 69, whereby the T-bar 69 is configured to service the sequencer assembly 20—two being needed to secure the cover 39 and left in the tank 29—by removing them and then using one to secure to the service nipple 68 and to remove the cover from outside the tank 29. The elongated T-bar 69 advantageously be designed with as long of an elongated shaft as desired to service the sequencer assembly 20 while in tank 29.

Referring to FIGS. 1, 2, 6, 7 and 8, a system 20 for sequencing is configured by grouping cells 21 into pairs of lift and trigger cells 22, 23, respectively, to sequence between a first and second outlets or pipes 30 from the tank 29, as shown in FIG. 1. According to an embodiment of the present invention, additional pairs of lift and trigger cells 22, 23 can be added to the sequencer assembly 20 advantageously to: (i) scale the system (ii) actuate another existing floating outlet to vary the dosing volume of fluid to an outlet, (iii) actuate additional floating outlets, e.g. three outlets, four outlets, . . . , N outlets advantageously to dose a plurality of outlets of the tank 29, or (iv) to turn on or shut off outlets thereby allowing a particular absorption field to rest.

According to the operation of the sequencer assembly, system and method the present invention 20, fluid rises in the tank 29 and enters the sequencer assembly 20 at opening 36 of each cell 21. As the effluent E enters the sequencer assembly 20, each of the floats 24 of each of the lift cells 22 and trigger cells 23 pairs begin to rise at the same rate except for cell 21 having the mass of the ball 28. If the ball 28 weighs down the float 24 of a lift cell 22, the lift cell 22 rises until the bottom of the upper inclined surface 42 aligns with an exit opening 38 to the adjacent trigger cell 23 or, alternatively, the entry opening 37 of the adjacent trigger cell 23. The ball 28 is transferred to the trigger cell 23 by gravity as the ball 28 rolls down the upper inclined surface 42. In the case of the ball 28 weighing down the float 24 of a trigger cell 23, each lift cell 22, and each of the other trigger cells 23 rise, as the effluent E enters the sequencer assembly 20. In the other cells, including other trigger cells 23, the trigger tubes 25 rise because these are connected to the unconstrained floats 24 which rise, float and or are maintained at or above the fluid, thereby fluid is not forced to the connected floating outlets 27. When the ball 28 is in the trigger cell 23 with the active trigger tube 25, the ball 28 first rolls down the inclined surface 42 to the exit opening 38 and becomes trapped at the lower edge as the exit opening 37 is blocked by the float body 41 of the adjacent lift cell 22. Eventually, the float 24 cannot rise further as fluid fills the tank 29 because the float 24 is weighed down by the ball 28 and the stop block 49 pins the ball 28 and the float 24 down. As a result, the active, connected trigger tube 25 is forced below the level of rising fluid. The use of stop block 49 holds the float 24 for a sufficient time so that fluid is forced up through the trigger tube 25 out through hose 26 to the respective floating outlet 27, thereby creating a vacuum or negative pressure to start the pre-filling such the floating outlet 27. Once started, the pre-filled floating outlet 27 sinks before all others and completely fills, thereby emptying fluid from the tank 29 and/or chamber. The other floating outlets 27 float on top of the draining fluid as it is emptying from the tank 29. The vent 55 of the trigger tube 25 allows air to escape the floating outlet 27 at the end of the cycle emptying of the tank 29 allowing the floating outlet to rise and float on top of the fluid. The vent 55 also functions to keep surface debris out of the floating outlet 27. Once triggering the cycle to empty the tank 29, the ball 28 is transferred to the lift cell 22 by gravity as the exit opening 38 to the adjacent lift cell 22 opens by the sinking float 24 when its upper surface aligns with an edge of the trigger cell's 23 exit opening 38, or alternatively stated, to the entry opening 37 of the adjacent lift cell 22.

Figure 6:
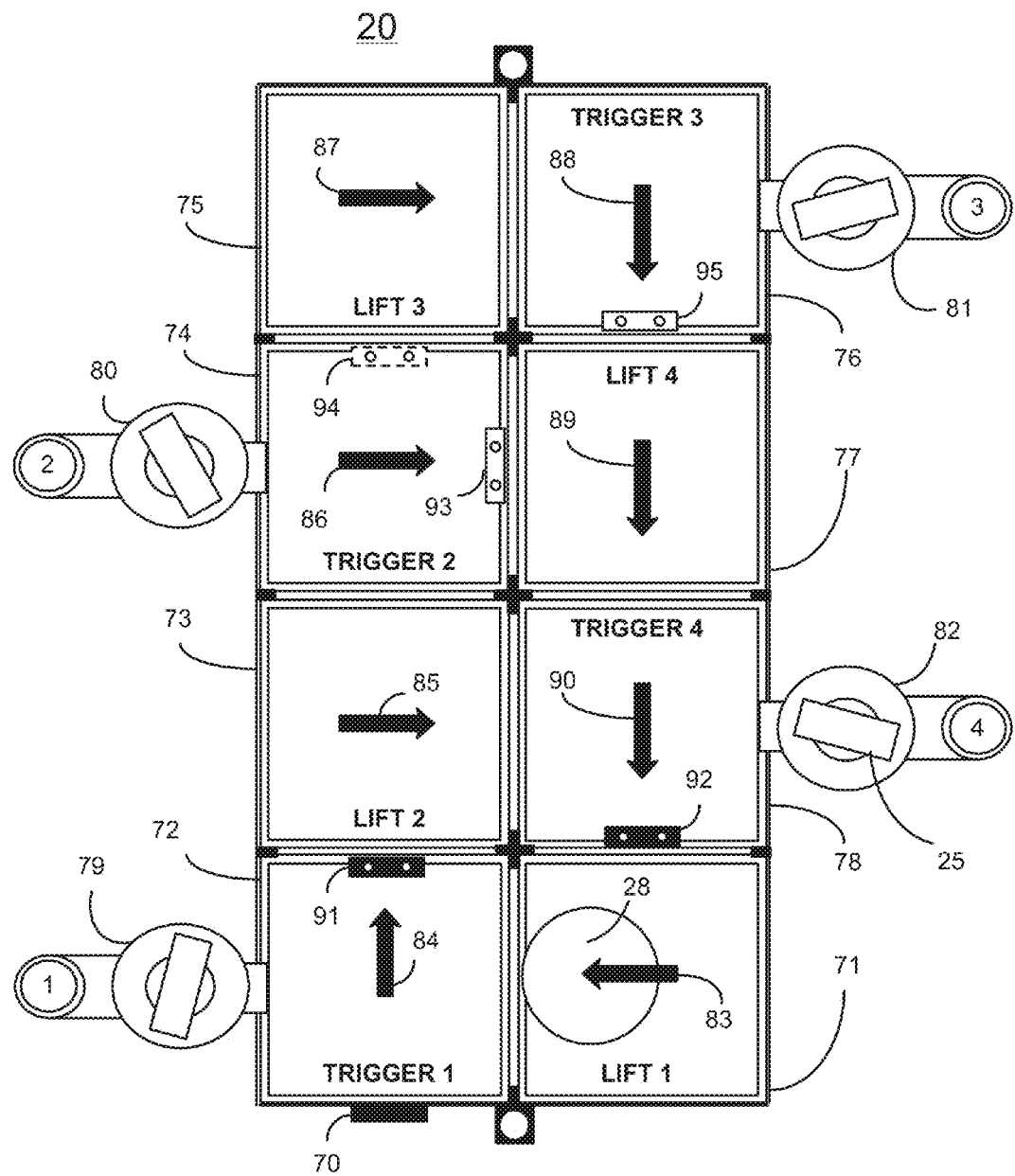
FIG. 6 illustrates an exemplary top view of a sequencer servicing two outlets as a non-limiting aspect of the present invention.
Figure 7:
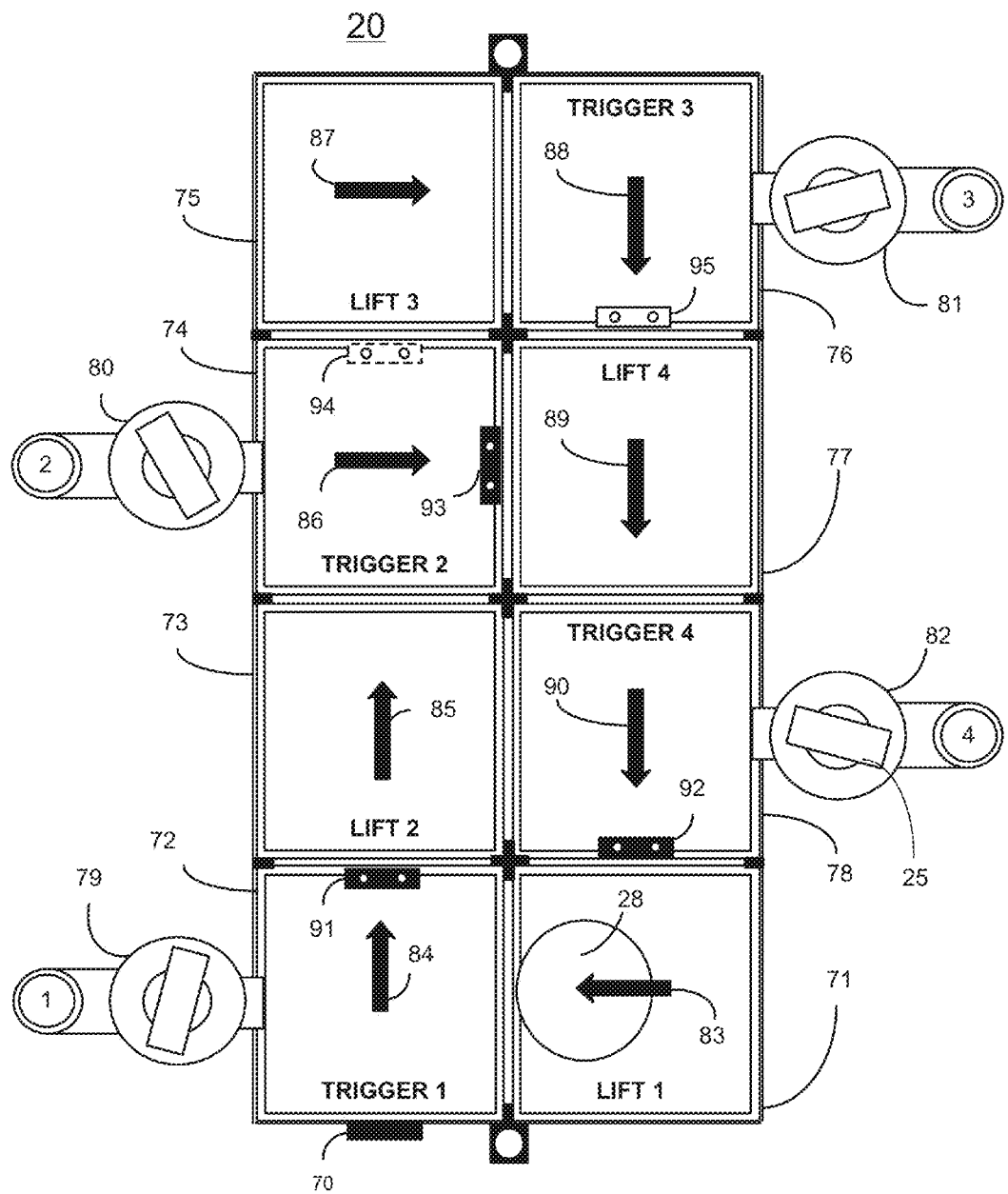
FIG. 7 illustrates an exemplary top view of a sequencer servicing three outlets as a non-limiting aspect of the present invention.
Figure 8:
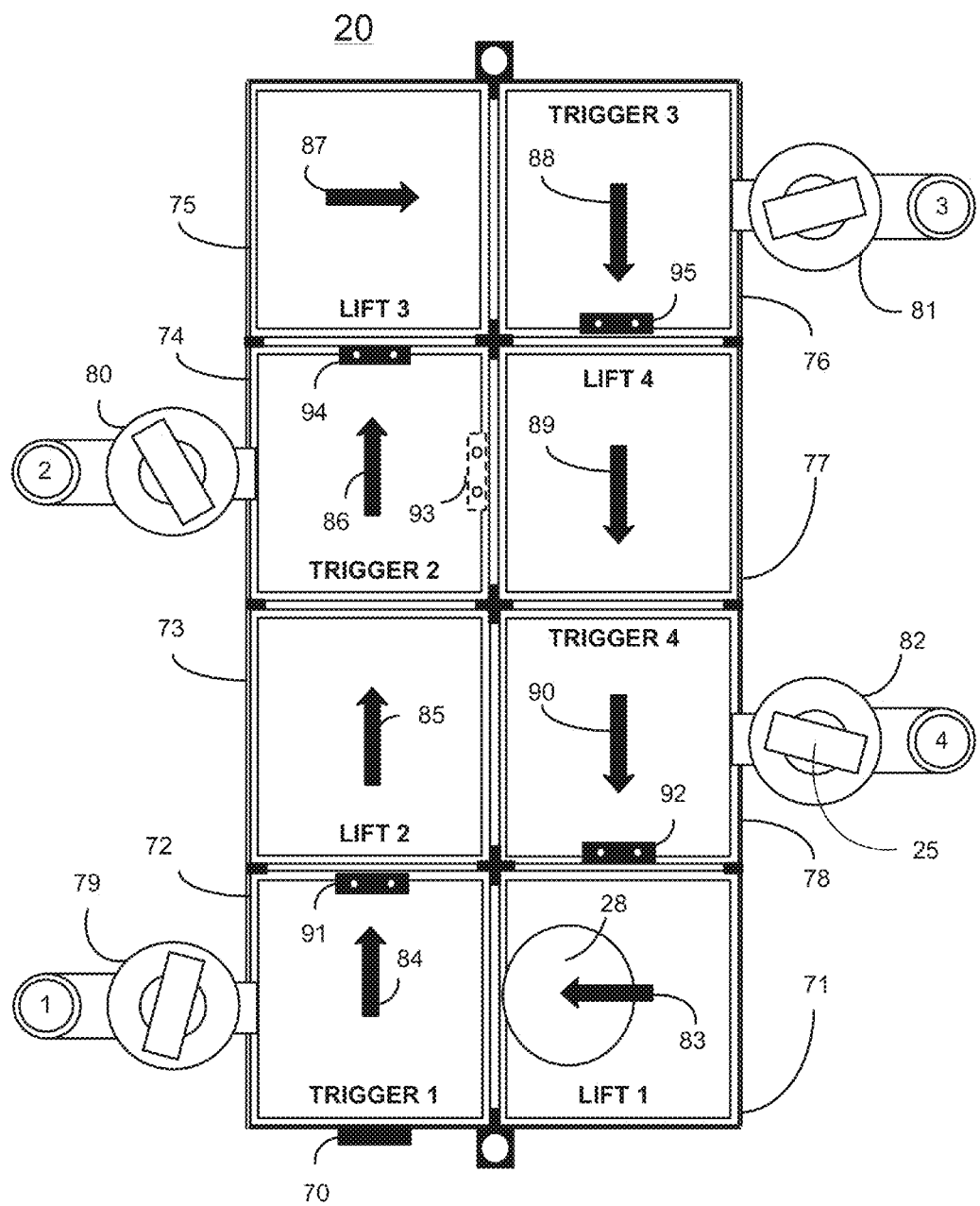
FIG. 8 illustrates an exemplary top view of a sequencer servicing four outlets as a non-limiting aspect of the sequencer and method of the present invention present invention.

As is illustrated in FIGS. 6, 7 and 8, the setup and operation of an eight-cell sequencer assembly 20 is used to sequence the operation of two, three and/or four floating outlets. Set-up orientation is started with the location of a key 70 that integrates with the notch 63 of cover 39 and is located at one end of the assembly 20. Clockwise or counter-clockwise operation are possible; however, setup is easier if the operator maintains one orientation. In a clockwise orientation, the sequencer assembly 20 is easily configured by orientation of (i) a first ($1^{st}$) lift cell 71, a first ($1^{st}$) trigger cell 72, a second ($2^{nd}$) lift cell 73, a second ($2^{nd}$) trigger cell 74, a third ($3^{rd}$) lift cell 75, a third ($3^{rd}$) trigger cell 76, a fourth ($4^{th}$) lift cell 77, a fourth ($4^{th}$) trigger cell 78; respective a first ($1^{st}$) trigger tube assembly 79, a second ($2^{nd}$) trigger tube assembly 80, a third ($3^{rd}$) trigger tube assembly 81, and a fourth ($4^{th}$) trigger tube assembly 81; and respective directions of upper inclined surfaces 42 of them as shown by direction arrows 83, 84, 85, 86, 87, 88, 89, and 90, and (ii) placement of a plurality of stop blocks 49 at locations 91, 92, 93, 94 and/or 95. Stop block positions 93, 94 and 95 cannot be reached because of the orientation of inclined surfaces of the second ($2^{nd}$) lift cell 73 and the fourth ($4^{th}$) trigger cell 78, and subsequently are shown by phantom lines.

Referring to FIG. 6, by way of example, the set-up and operation of the sequencer assembly 20 for actuating two outlets is described. The ball 28 moves clockwise through the sequencer assembly 20 beginning in the first ($1^{st}$) lift cell 71 moving to the first ($1^{st}$) trigger cell 72 attached to first ($1^{st}$) trigger tube assembly 79. The ball 28 moves through the entry/exit openings 37, 38 because the slightly longer float body 41 positions ball 28 at the exit opening 38 of the first ($1^{st}$) lift cell 71 as the float 24 rises, thereby using gravity and the inclined surface 71 to cause it to fall through the exit opening 38 to the float of the first ($1^{st}$) trigger cell 72. The ball 28 enters the first ($1^{st}$) trigger cell and settles to rest at the exit opening 38 between the stop block 91 and the upper inclined surface 42 of the float 24. The trigger tube assembly 79 actuates the respective floating outlet 27 by the action of: (i) the ball 28 weighing down the first ($1^{st}$) trigger cell 72 that causes the other cells of the first ($1^{st}$) lift cell 71, the second ($2^{nd}$) lift cell 73, and the fourth ($4^{th}$) trigger cell 78 to rise faster; and (ii) the ball 28 is held between the stop block 91 and the upper inclined surface 42 of the float 24 of the first ($1^{st}$) trigger cell 72 causing the associated trigger tube outlet 54 to submerge under the rising fluid creating early flow to the floating outlet 27. Once actuated, the fluid starts to empty from the tank 29 and the ball 28 is transferred to the second ($2^{nd}$) lift cell 73 as the float 24 of the second ($2^{nd}$) lift cell 73 sinks thereby opening the exit opening 38 to the second ($2^{nd}$) lift cell 73. The vent 55 of the outlet 54 assists to clear water from tube 53, the trigger hose 26, and the floating outlet at this lower level of fluid. The tank 29 will empty until the actuated floating outlet 27 begins to float as well as the floats 24 of all of the cells 71 through 78, whereby the second ($2^{nd}$) lift cell 73 raises the ball 28 to the exit, entry opening 38, 37 to the fourth ($4^{th}$) trigger cell 78, thereby transferring the ball 28 to the fourth ($4^{th}$) trigger cell 78, which weights down the float 24 and the ball 28 is trapped at the exit opening 38 between the upper inclined surface 90 and the stop 92, thereby actuating the floating outlet 27 connected to the fourth ($4^{th}$) trigger tube assembly 82 as described above in regard to the first ($1^{st}$) trigger cell 72. This cycle will repeat continuously according to this sequence.

As is illustrated in FIG. 7, the set-up and operation of the sequencer assembly 20 for actuating three outlets is described. For example, activation of the first ($1^{st}$)-, second ($2^{nd}$)-, and fourth ($4^{th}$) trigger tube assemblies 79, 80 and 82, respectively, in the sequencer assembly 20 is accomplished by orientating (i) the upper inclined surface 42 by direction arrows 83, 84, 85, 86, 87, 88, 89, and 90, and (ii) placement of a plurality of stop blocks 49 at locations 91, 92, and 93. Stop block positions 94 and 95 cannot be reached because of the orientation of inclined surfaces of the second ($2^{nd}$) trigger cell 74 and the fourth ($4^{th}$) lift cell 77, and subsequently are shown by phantom lines. Trigger cell 74 for the $2^{nd}$ trigger tube assembly 80 is activated by (i) re-orienting by ninety degrees the direction of the upper inclined surface 42 in the direction of arrow 86 and (ii) (a) orienting stop block 93; or (b) re-positioning stop block 94 ninety degrees at the position shown for stop block 93, as only one stop block is needed in the cell 21. This cycle will repeat continuously according to the sequence of transferring from the first ($1^{st}$) lift cell 71 to first ($1^{st}$) trigger cell 72; then to the second ($2^{nd}$) lift cell 73 to a second ($2^{nd}$) trigger cell 74; then to the fourth ($4^{th}$) lift cell 77 to the fourth ($4^{th}$) trigger cell 78 actuating along the way the associated first ($1^{st}$) trigger tube assembly 79, second ($2^{nd}$) trigger tube assembly 80, and fourth ($4^{th}$) trigger tube assembly 82 as described above according to pattern of rising and falling for the sequencer for the two floating outlet operation.

Referring to FIG. 8, the set-up and operation of the sequencer assembly 20 for actuating four outlets is described. For example, activation of the first ($1^{st}$)-, second ($2^{nd}$)-, third ($3^{rd}$)- and fourth ($4^{th}$) trigger tube assemblies 79, 80, 81 and 82, respectively, in the sequencer assembly 20 is accomplished by orientating (i) the upper inclined surfaces 42 by direction arrows 83, 84, 85, 86, 87, 88, 89, and 90, and (ii) placement of a plurality of stop blocks 49 at locations 91, 92, 94 and 95. Stop block position 93 cannot be reached because of the orientation of inclined surface of the second ($2^{nd}$) trigger cell 74, as well as, of course, the associated surfaces of the third ($3^{rd}$) lift cell 75, the third ($3^{rd}$) trigger cell 76, and the fourth ($4^{th}$) lift cell 77, and subsequently is shown by phantom lines. Trigger cell 76 for the third ($3^{rd}$) trigger tube assembly 81 is activated by (i) re-orienting by ninety degrees the direction of the upper inclined surfaces 42 in the direction of arrow 75 and (ii) re-orienting by ninety degrees both stop block 93 positioned at 94. The ball 28 is passed sequentially between lift cell 22 and trigger cell 23 triggering the floating outlet 27 such as, for example, the ball 28 travelling in sequence between the first ($1^{st}$) lift cell 71 and first ($1^{st}$) trigger cell 72 actuating the floating outlet 27 by the respective a first ($1^{st}$) trigger tube assembly 79; the second ($2^{nd}$) lift cell 73 and the second ($2^{nd}$) trigger cell 74 actuating the floating outlet 27 by the respective a first second ($2^{nd}$) trigger tube assembly 80; the third ($3^{rd}$) lift cell 75 and the third ($3^{rd}$) trigger cell 76 actuating the floating outlet 27 by the respective third ($3^{rd}$) trigger tube assembly 81; and the fourth ($4^{th}$) lift cell 77 the fourth ($4^{th}$) trigger cell 78 actuating the floating outlet 27 by the respective fourth ($4^{th}$) trigger tube assembly 82. This cycle will repeat continuously according to the sequence of transferring from the first ($1^{st}$) lift cell 71 to first ($1^{st}$) trigger cell 72; then to the second ($2^{nd}$) lift cell 73 to a second ($2^{nd}$) trigger cell 74; then to the third ($3^{rd}$) lift cell 75 to the third ($3^{rd}$) trigger cell 76; and then to the fourth ($4^{th}$) lift cell 77 to the fourth ($4^{th}$) trigger cell 78 actuating along the way the associated first ($1^{st}$) trigger tube assembly 79, second ($2^{nd}$) trigger tube assembly 80, third ($3^{rd}$) trigger tube assembly 81, and fourth ($4^{th}$) trigger tube assembly 82, scaling the sequencing by additional outlets for the two-, and three-floating outlet operation.

Figure 10:
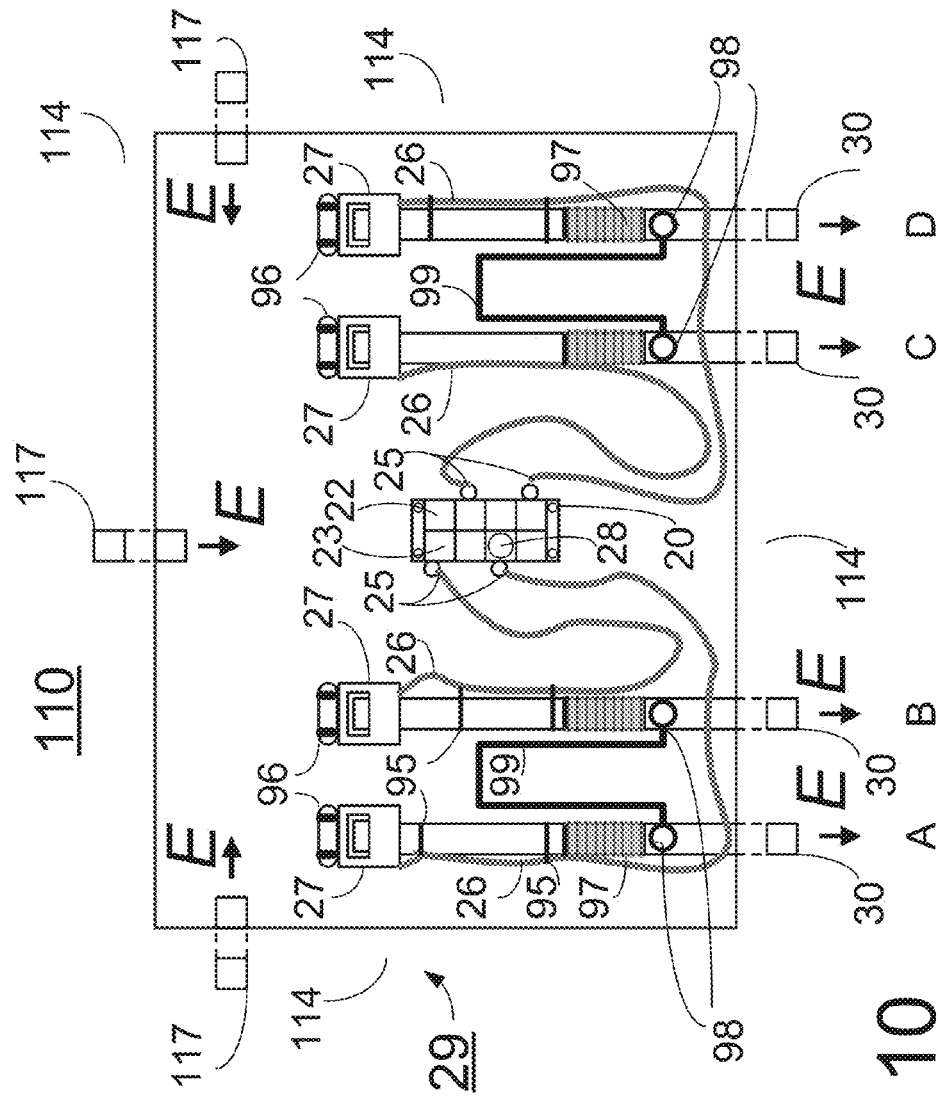
FIG. 10 illustrates a top view of the sequencer system with a plurality of outlets as a non-limiting aspect of the present invention.

Moreover, the sequencer system and assembly 20 of the present invention has floating outlets 27 that include ties 95, a ballast 96, and flexible connector 97 as shown in FIGS. 1 and 10-12. The ties 95 can be utilized to secure the trigger hose 26 to the flouting outlet 27 at various points to prevent drift, fouling and or dislocation during normal operation. The floating outlets 27 advantageously include ballast connected to the floating head to accelerate the sinking of floating outlet 27. The flexible connect 97 is configured from flexible rubber to allow the head float of the floating outlet 27 to cycle between floating and downdraft positions. The sequencer system and assembly 20 is configured to include a tank overflow safety vent 98 (FIGS. 1, 10-12) and a drift bar 99 (FIG. 10). The tank overflow safety vent 98 functions to draw fluid 107 from the tank 29 if the maximum fluid level and/or volume is reached, thereby creating a level of safety from fouling the cells 21, floats 24, and/or ball 28 of the sequencer assembly 20 from, for example, effluent E entering the upper portion through cover 39. The drift bar 99 is arranged between floating outlets 27 and functions to prevent jamming and/or collisions between floating outlets 27 due to side-to-side drift, floating and the like.

Figure 9:
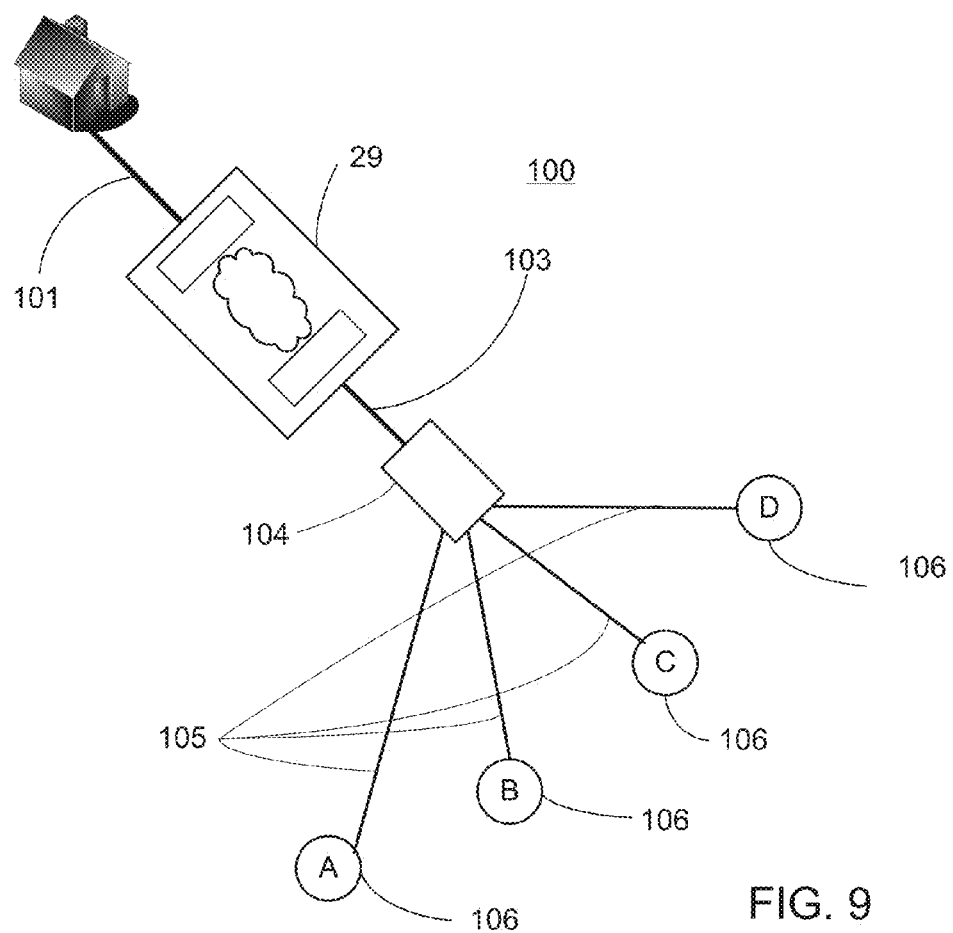
FIG. 9 illustrates a schematic view of a septic system with multiple disposal fields.

Referring now to FIG. 9, where like elements are identified by like numbers in the drawings, a septic system is shown generally at 100, which is suited for dosing effluent E into a disposal field, which term shall be used interchangeably with drain field, septic field, leach field, water filtration, waste water reclamation, and other like terms. For ease of description, not all reference characters are shown in each drawing figure.

Figure 11:
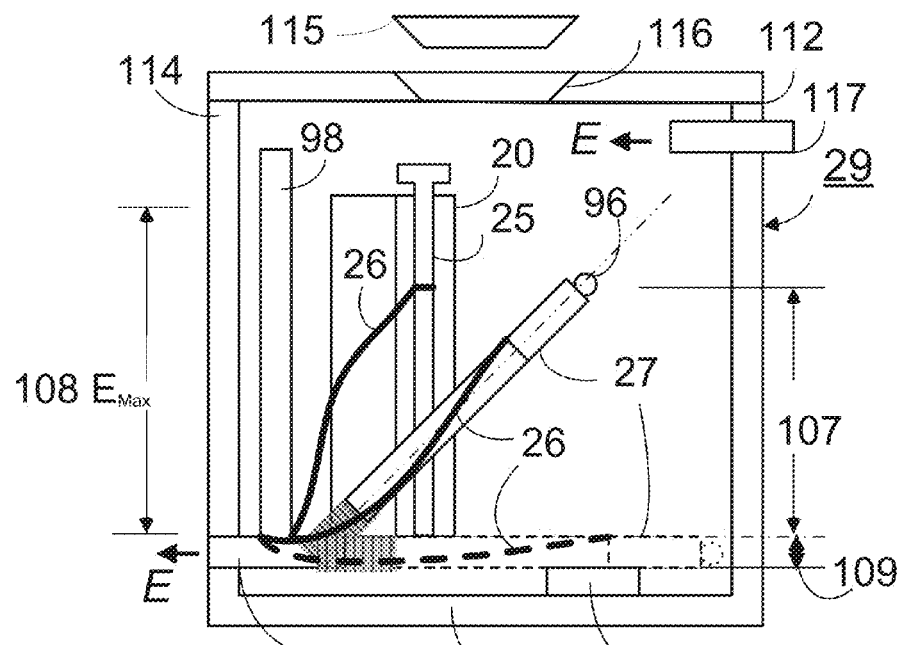
FIG. 11 illustrates a side view of the sequencer system with a plurality of outlets as a non-limiting aspect of the present invention.
Figure 12:
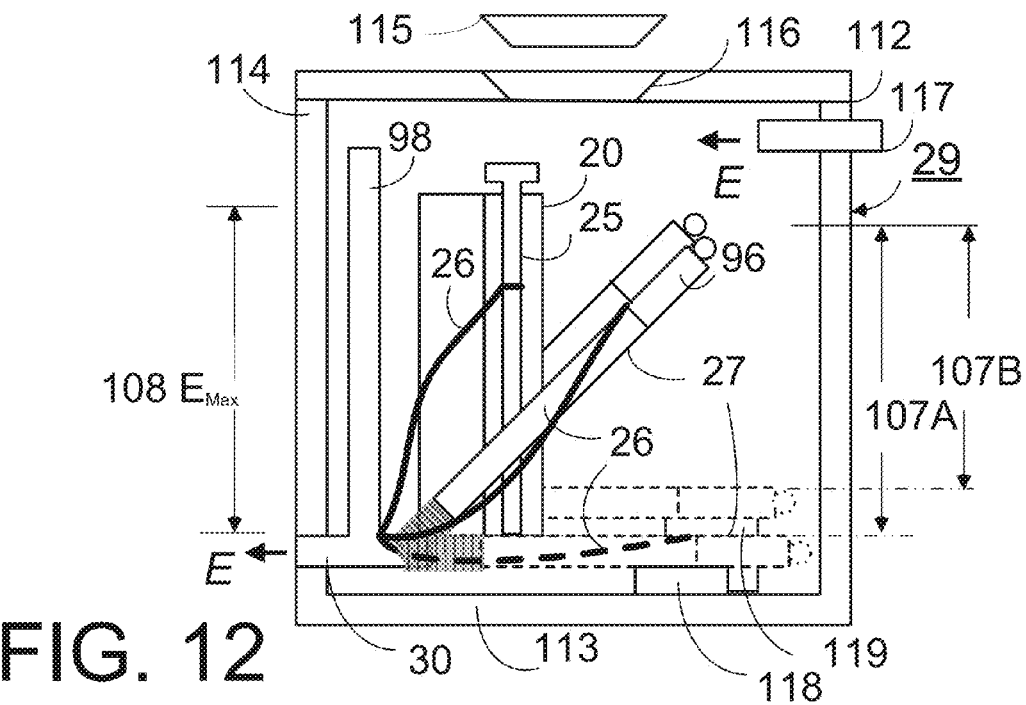
FIG. 12 illustrates a side view of the sequencer system for dosing different volumes of fluid to each of a plurality of outlets as a non-limiting aspect of the present invention.

The septic or sewage treatment system 100 consists of a house sewer 101 connected to a septic tank 29 that is further connected by an output conduit 103 to a distribution box 104 that outputs Effluent E (E hereafter) via output pipes 105 to a plurality of absorption fields and/or seepage pits 106 (denoted A, B, C and D hereinafter). The septic tank 29 and distribution box 104 structures are constructed of concrete as walled, relatively water-tight tank sufficient to house a volume of fluid 107, and a maximum volume of fluid 108, and a minimum volume of fluid 109, such volume levels 107, 108 and 109 are shown in FIGS. 10-12. The septic tank 29 is filled with water and sewage (E), scum (shown "cloud-shaped" in tank 29) rises to the surface and is held between baffles (shown "block(s)" in tank 29), sediment falls to the bottom. The septic tank is a buried structure with covers to access it. Sewage treatment proceeds to be digested in the septic tank 29 in a known way and exits by an output pipe. A typical one outlet, un-sequenced septic treatment system 100 is illustrated in FIG. 9. By way of example, current septic systems either do not have the ability to dose separate fields or utilize pumps or electro-hydronic devices to dose separate fields where these devices have disadvantages of being expensive, complex to install, consume energy, and are prone to failure, which has an associated maintenance and/or failure servicing cost to the system installation. Accordingly, there is a need in the art for a sequencer and system that will overcome these disadvantages to provide advantageously distributing fluid 107 or other Effluent E from the septic tank 29 or from the distribution box 104 sequentially by the systematic dosing of a plurality of disposal fields 106 A, B, C, D according to the system and method of the present invention. Advantages also include being able to retrofit existing systems to add an additional distribution field 107 in residential applications where, for example, the original field A has become clogged or tired, and another field B is added and other system components are reused, for example, of the septic tank 29, conduit 103 and distribution box 104.

According to an embodiment of the present invention, as illustrated in FIGS. 9, 10, and 11, a multiple outlet sequenced system 110 is described in a septic application and is useful in dosing multiple outlets from a septic tank 29 or distribution box 104 to a plurality of disposal fields 106 (shown as A, B, C and D). The four outlet sequenced system 110 comprises a relatively water-tight walled structure of a septic tank 29 capable of accumulating a volume of Effluent E from a source such as, for example, a residence or other building. The septic tank 29 has a top wall 112, a bottom wall 113, four side walls 114, and a cover 115 adapted to mount on an aperture or opening 116 in the top wall 112 to access the interior structure of the septic tank 29. The septic tank 29 accepts inputs of Effluent E from one or more input conduits 117 into a wall of the septic tank 29, for example, entering through side walls 114. The septic tank 29 also outputs Effluent E to one or more output pipes 30 passing the flow of Effluent E there through to each of the disposal fields 106 A, B, C and D. The septic tank 29 has a four output a sequencer assembly 20 disposed therein attached by trigger tube assemblies 25 connected by trigger tube hose 26 to each of four floating outlets 27. The sequencer assembly 20 has a ball 28 for actuating a particular floating outlet 27 in sequence, for example, as shown the ball 28 will actuate respective the floating outlet 27 connected to output pipe 30 for sending Effluent E to disposal field A.

As illustrated in FIGS. 1, 2, 6-8, and 10-11, the ball 28 can be transferred sequentially between lift cell 22 and trigger cell 23 by floats rising and falling because of the fluid level 107 such as, for example, the ball 28 is passed sequentially between lift cell 22 and trigger cell 23 triggering the floating outlet 27 such as, for example, the ball 28 travelling in sequence between the first ($1^{st}$) lift cell 71 and first ($1^{st}$) trigger cell 72 actuating the floating outlet 27 by the respective a first ($1^{st}$) trigger tube assembly 79; the second ($2^{nd}$) lift cell 73 and the second ($2^{nd}$) trigger cell 74 actuating the floating outlet 27 by the respective a first second ($2^{nd}$) trigger tube assembly 80; the third ($3^{rd}$) lift cell 75 and the third ($3^{rd}$) trigger cell 76 actuating the floating outlet 27 by the respective third ($3^{rd}$) trigger tube assembly 81; and the fourth ($4^{th}$) lift cell 77 the fourth ($4^{th}$) trigger cell 78 actuating the floating outlet 27 by the respective fourth ($4^{th}$) trigger tube assembly 82. This cycle will repeat continuously according to the sequence of transferring from the first ($1^{st}$) lift cell 71 to first ($1^{st}$) trigger cell 72; then to the second ($2^{nd}$) lift cell 73 to a second ($2^{nd}$) trigger cell 74; then to the third ($3^{rd}$) lift cell 75 to the third ($3^{rd}$) trigger cell 76; and then to the fourth ($4^{th}$) lift cell 77 to the fourth ($4^{th}$) trigger cell 78 actuating along the way the associated first ($1^{st}$) trigger tube assembly 79, second ($2^{nd}$) trigger tube assembly 80, third ($3^{rd}$) trigger tube assembly 81, and fourth ($4^{th}$) trigger tube assembly 82.

As illustrated in FIG. 12, another aspect of the sequencer, system and method for sequencing of the present invention is to sequence different volumes of fluid to each output from the septic tank 29. In the septic application, the sequencer assembly 20 and system 110, certain disposal fields can fill and loose capacity. For example, the sequencer assembly 20 of system 110 can be configured to dose and output different volumes of fluid 107A and 107B to disposal field A and B, respectively, by supporting each floating outlet 27 at a different height from the bottom 113 of the tank using a block 118 and larger block 119. In this manner, the drawdown level is different for each floating outlet 27 thereby varying the volume of fluid output sequentially by the systematic dosing of the plurality of disposal fields 106, e.g. A, B, C, and/or D. As a result, the sequencer assembly 20 in the tank 29 advantageously be utilized to vary the volume of fluid output sequentially to each disposal fields 106 A, B, C, D, without additional devices, by adjusting the drawdown level of each floating outlet 27, which has been a long-felt need in the art.

While certain configurations of structures have been illustrated for the purposes of presenting the basic structures of the present invention, one of ordinary skill in the art will appreciate that other variations are possible which would still fall within the scope of the appended claims. Additional advantages and modifications will readily occur to those skilled in the art. For example, the assembly can be made by injection molding, vacuum forming, and/or extrusion techniques. The sequencer assembly also can be useful for watering systems in agricultural applications such as, for example, to provide water from a reservoir drawing tank to selected fields or from a cistern to selected zones. The sequencer assembly and system also is useful in indoor or soil-less hydroponic gardening systems to dose hydroponic nutrients at selected times. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A sequencer for controlling the distribution of fluid to at least two outputs, comprising: a plurality of cells for actuating a floating outlet, each cell comprising an enclosure, a float having an inclined upper surface, and a movable mass, said enclosure having an inlet to allow fluid into each cell causing said float to be raised or lowered by the fluid, and openings to allow said movable mass to enter and exit each of said cell; and said cells being arranged in pairs of a lift cell and a trigger cell, said trigger cell being connected to a tube assembly whereby the fluid flows to said floating outlet when said movable mass enters said cell to restrain said trigger cell.

2. The sequencer as claimed in claim 1, wherein said float has a specific gravity of less than 1.

3. The sequencer as claimed in claim 1, wherein said trigger cell suppresses a float connected to said tube assembly through a slot in said enclosure of said trigger cell allowing a particular floating outlet to sink before other of said floating outlets connected said plurality outlets, thereby causing fluid to flow out of the tank from the output of said particular floating outlet.

4. The sequencer as claimed in claim 1, wherein said lift cell, said trigger cell, and said float are each configured of a predetermined length depending on the volume of the fluid to be sent out the outlet.

5. The sequencer as claimed in claim 1, wherein said float includes a bearing adapted to create a gap between adjacent walls of the enclosure and the float functioning to ensure against binding of when said float is raised or lowered by the fluid.

6. The sequencer as claimed in claim 1, wherein each of said enclosure of said cell and an enclosure of said float have an elongated, square body, whereby said enclosure of said float is configured to have a dimension smaller than said dimension of said enclosure of said cell so as to be received slidably therein so as to function to raise or lower said float by the fluid.

7. The sequencer as claimed in claim 6, wherein said enclosure of each of said float and said cell is made from thermoplastic polymers including PVC.

8. The sequencer as claimed in claim 6, wherein said enclosure of said float further includes buoyant means disposed in an inner cavity of said enclosure.

9. The sequencer as claimed in claim 8, wherein said buoyant means is closed cell thermoplastic polymers having a specific gravity less than 1.

10. The sequencer as claimed in claim 9, wherein said closed cell thermoplastic polymer is secured within said enclosure of said float.

* * * * *